(12) United States Patent
Kumakiri et al.

(10) Patent No.: US 7,687,196 B2
(45) Date of Patent: Mar. 30, 2010

(54) PRISMATIC BATTERY AND METHOD FOR MANUFACTURING THE SAME

(75) Inventors: Hideyuki Kumakiri, Chigasaki (JP); Shintaro Shimizu, Fujisawa (JP); Akira Yoneyama, Chigasaki (JP); Yoshihiro Bouki, Fujisawa (JP); Takuma Iida, Toyohashi (JP)

(73) Assignee: Panasonic Corporation, Osaka (JP)

( * ) Notice: Subject to any disclaimer, the term of this patent is extended or adjusted under 35 U.S.C. 154(b) by 1060 days.

(21) Appl. No.: 10/881,256

(22) Filed: Jun. 30, 2004

(65) Prior Publication Data
US 2005/0003267 A1    Jan. 6, 2005

(30) Foreign Application Priority Data

| | | |
|---|---|---|
| Jul. 1, 2003 | (JP) | ............................ 2003-189365 |
| Oct. 20, 2003 | (JP) | ............................ 2003-359640 |
| Mar. 29, 2004 | (JP) | ............................ 2004-096013 |

(51) Int. Cl.
*H01M 10/04* (2006.01)
(52) U.S. Cl. ...................... 429/163; 429/176; 429/164
(58) Field of Classification Search ......... 429/160–180, 429/94, 185
See application file for complete search history.

(56) References Cited

U.S. PATENT DOCUMENTS

| | | | | |
|---|---|---|---|---|
| 5,556,722 | A * | 9/1996 | Narukawa et al. ........... 429/163 |
| 5,827,621 | A | 10/1998 | Morishita et al. | |
| 6,534,952 | B1 * | 3/2003 | Ishikawa et al. .............. 429/48 |
| 6,777,130 | B2 * | 8/2004 | Kasahara et al. ............ 429/176 |
| 6,951,576 | B1 * | 10/2005 | Takeuchi ................... 29/623.1 |
| 7,348,095 | B2 * | 3/2008 | Katsumoto et al. .......... 429/176 |
| 2003/0134192 | A1 * | 7/2003 | Katsumoto et al. .......... 429/176 |
| 2003/0182792 | A1 | 10/2003 | Katsumoto et al. | |

FOREIGN PATENT DOCUMENTS

| | | | |
|---|---|---|---|
| CN | 1354892 | | 6/2002 |
| JP | 63034863 | A * | 2/1988 |
| JP | 63-207048 | | 8/1988 |
| JP | 06-007494 | B2 * | 1/1994 |
| JP | 06109435 | A * | 4/1994 |
| JP | 7-226212 | | 8/1995 |
| JP | 11051629 | A * | 2/1999 |
| JP | 2000188104 | A * | 7/2000 |
| JP | 2001319680 | A * | 11/2001 |
| JP | 2002-141100 | | 5/2002 |
| JP | 2002-208380 | | 7/2002 |
| WO | 02/03484 | | 1/2002 |
| WO | WO 0217412 | A2 * | 2/2002 |

* cited by examiner

*Primary Examiner*—Dah-Wei D Yuan
*Assistant Examiner*—Edu E Enin-Okut
(74) *Attorney, Agent, or Firm*—Hamre, Schumann, Mueller & Larson, P.C.

(57) ABSTRACT

A prismatic battery having advantages of both a rectangular battery and a cylindrical battery and having excellent properties is provided. Furthermore, a method of manufacturing the prismatic battery, suppressing the occurrence of defects in manufacturing the prismatic batteries and having an excellent productivity is provided. A prismatic battery including: an electrode plate group, an electrolyte and a battery case for accommodating the electrode plate group and the electrolyte; wherein the side face of the battery case includes a cylindrical head portion; a prismatic body potion for accommodating the electrode plate group and the electrolyte; and a transition portion located between the body portion and the head portion.

11 Claims, 14 Drawing Sheets

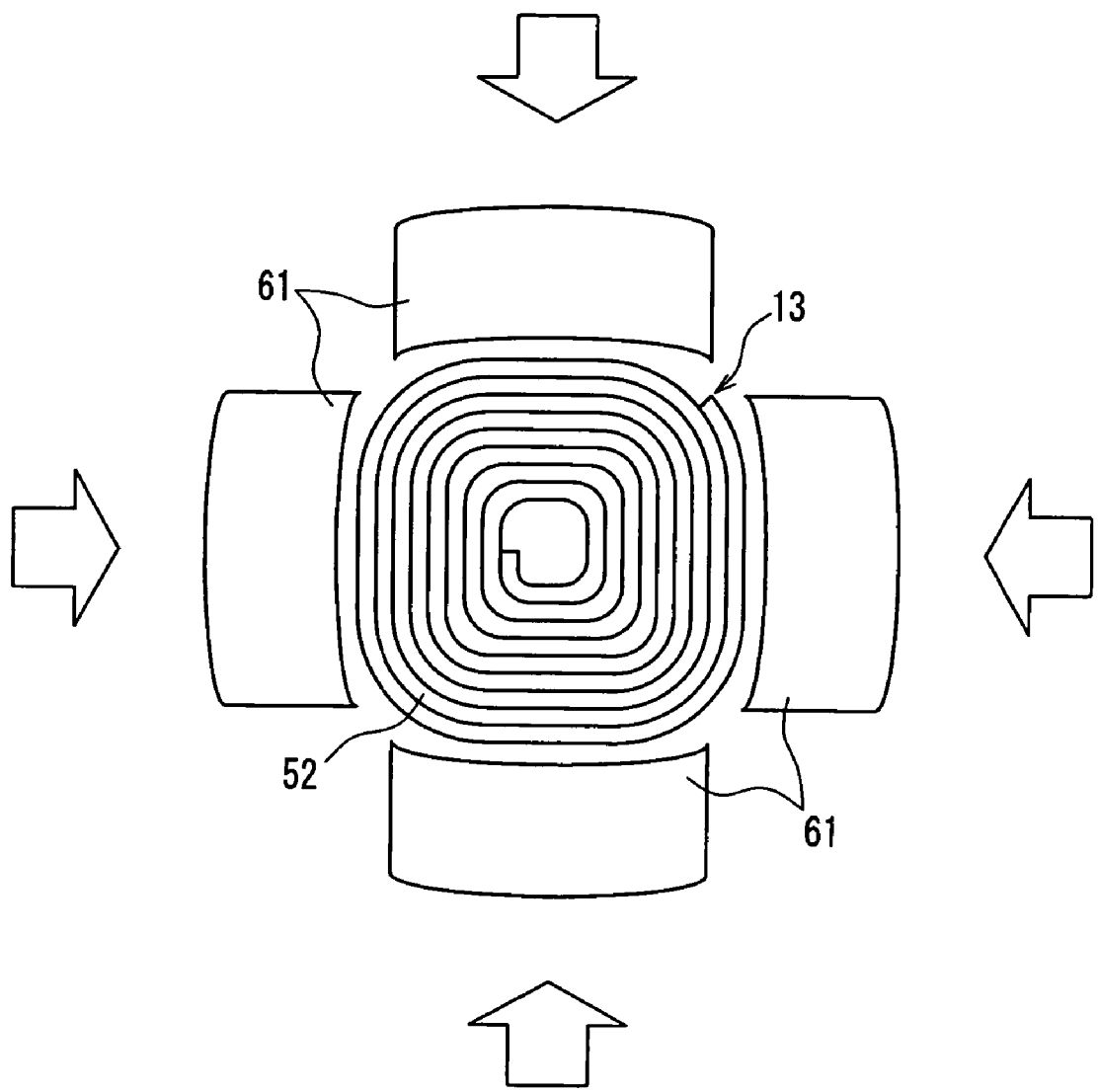
F I G. 10

PRISMATIC BATTERY AND METHOD FOR MANUFACTURING THE SAME

BACKGROUND OF THE INVENTION

1. Field of the Invention

The present invention relates to a prismatic battery and a method for manufacturing the same.

2. Description of Related Art

In recent years, accompanying the development of portable electronic equipment, the roles of batteries including primary batteries and secondary batteries have become increasingly important. Competition to make equipment on which a battery is mounted have a smaller size and a higher function has become fierce. Mainly, batteries capable of achieving a small size, high volume and high output have been demanded in the market.

As such batteries, conventionally, rectangular batteries or cylindrical batteries have been common. Each shape has respective features, for example, high space efficiency for stacking and integrating, etc. in integrating a plurality of batteries, high productivity, and the like. However, in other words, each shape has respective problems. In rectangular batteries, for example, sealing the battery is more difficult as compared with the case of cylindrical batteries. Furthermore, in cylindrical batteries, for example, in stacking and integrating a plurality of batteries, a larger dead space is formed as compared with the case of rectangular batteries.

In order to solve these problems described above, a battery including a battery case having a prismatic body for accommodating an electrode plate group, etc. and a cylindrical head portion for sealing the battery is disclosed (see, for example, JP63-207048A, JP2002-141100A, and JP2002-208380A, etc.). By allowing a battery to have such a configuration, a battery having high property having both advantages of a rectangular battery and a cylindrical battery is expected to be provided.

Furthermore, JP7-226212A discloses a technique for accommodating an electrode plate group, which was formed so as to have a rectangular parallelepiped shape, into a prismatic battery case. More specifically, as shown in FIG. 18A, a cylindrically wound electrode plate group 102 is heated and pressed from all directions by using molds 103 disposed at intervals of 90° to allow the electrode plate group 102 to have a rectangular parallelepiped shaped cross section.

An example of a method for actually forming a battery disclosed in JP63-207048A and JP2002-208380A includes a method of forming a battery case by forming an opening end portion of a prismatic can into a cylindrical shape. However, at that time, a can may be swollen or wrinkled. For example, FIG. 17 is a schematic view showing an example of a conventional battery case having a prismatic body portion for accommodating an electrode plate group and an electrolyte, and a cylindrical head portion. When an opening end part of a prismatic can is just molded in a cylindrical shape, the can may be swollen in a region A or wrinkled in a region B in a battery case 101 shown in FIG. 17. If such defects occur, it becomes difficult to seal the battery, or liquid leakage may occur due to a crack in a battery case generated in the part where defects occur. Furthermore, from the viewpoint of productivity such as yield, etc. the reduction in such defects is demanded.

In order to solve these problems, for example, in the method disclosed in JP2002-141100A, an electrode plate group is accommodated in a cylindrical shaped battery case, its opening end is closed and sealed, and then a prismatic body portion is formed. However, in this method, when the prismatic body portion is formed, the deformation of the electrode plate cannot be avoided and short-circuit or dropping-off of active materials may occur.

Furthermore, in the method shown in JP7-226212A, in a case where a winding end portion 104 of the electrode plate group 102 is located on a side of the rectangular parallelepiped shape after molding, when the cylindrical plate group 102 is molded into a rectangular prallelopiped shape (FIG. 18A) or the electrode plate group 102 is inserted into the prismatic battery case 105, an internal short-circuit or defective insertion into the battery case 105 may occur.

SUMMARY OF THE INVENTION

With the foregoing in mind, it is an object of the present invention to provide a prismatic battery having advantages of both a rectangular battery and a cylindrical battery and having excellent properties. It also is an object of the present invention to provide a method of manufacturing the prismatic battery, suppressing the occurrence of defects in manufacturing the prismatic batteries and having an excellent productivity.

The prismatic battery of the present invention includes an electrode plate group, an electrolyte and a battery case for accommodating the electrode plate group and the electrolyte. The side face of the battery case includes a cylindrical head portion; a prismatic body portion for accommodating the electrode plate group and the electrolyte; and a transition portion located between the body portion and the head portion. The body portion include a flat surface portion; and a corner portion for connecting the adjacent flat surface portions by a curved surface. The transition portion has a continuous curved surface from a first boundary between the corner portion and the transition portion toward a second boundary between the head portion and the transition portion. A radius of curvature of the cross section of the continuous curved surface changes continuously from a radius of curvature of the cross section of the corner portion to a radius of the head portion, from the first boundary to the second boundary.

Furthermore, the prismatic battery of the present invention may include an electrode plate group including a positive electrode plate, a negative electrode plate and a separator; an electrolyte; and a battery case for accommodating the electrode plate group and the electrolyte. The side face of the battery case includes a cylindrical head portion; a prismatic body portion for accommodating the electrode plate group and the electrolyte; and the transition portion located between the body portion and the head portion. The body portion includes a flat surface portion and a corner portion for connecting the adjacent flat surface portions by a curved surface; the transition portion has a continuous curved surface from a first boundary between the corner portion and the transition portion toward a second boundary between the head portion and the transition portion. A radius of curvature of the cross section of the continuous curved surface changes continuously from a radius of curvature of the cross section of the corner portion to a radius of the head portion, from the first boundary to the second boundary. The electrode plate group is a plate group in which the positive electrode plate and the negative electrode plate are stacked with the separator interposed therebetween and the stack is wound. The shape of the cross section of the electrode plate group is rectangular, polygonal or oval. A radius of curvature of the cross section of a corner portion in the electrode plate group is larger than a radius of curvature of the inner circumference of the corner portion in the battery case. The electrode plate group is accommodated in the battery case in such a manner in which the winding end portion of the electrode plate group is located at the corner portion in the battery case.

Next, the method manufacturing the prismatic battery of the present invention is a method for manufacturing a prismatic battery including an electrode plate group including a positive electrode plate, a negative electrode plate and a separator, an electrolyte and a battery case for accommodating the electrode plate group and the electrolyte; and the electrode plate group is an electrode plate group in which the positive electrode plate and the negative electrode plate are stacked with the separator interposed therebetween and the stack is wound. The method includes the following steps: (i) stacking the positive electrode plate and the negative electrode plate with the separator interposed therebetween; winding the stack; and pressing the stack so as to have a rectangular, polygonal or flat cross sectional shape, (ii) accommodating the pressed electrode plate group and the electrolyte in the prismatic battery case having a side face provided with a flat surface portion, and a corner portion for connecting the adjacent flat surface portions by a curved surface; and (iii) sealing an opening portion of the battery case with a sealing member. In the step (i), the electrode plate group is pressed so that the radius of curvature of the cross section of a corner portion in the electrode plate group is larger than the radius of curvature of the inner circumference of the corner portion in the battery case and the winding end portion of the electrode plate group is located at the corner portion in the battery case.

BRIEF DESCRIPTION OF THE DRAWINGS

FIG. 10 is a schematic view showing an example of a step of the method for manufacturing a battery of the present invention.

DESCRIPTION OF THE PREFERRED EMBODIMENTS

Figure 1:
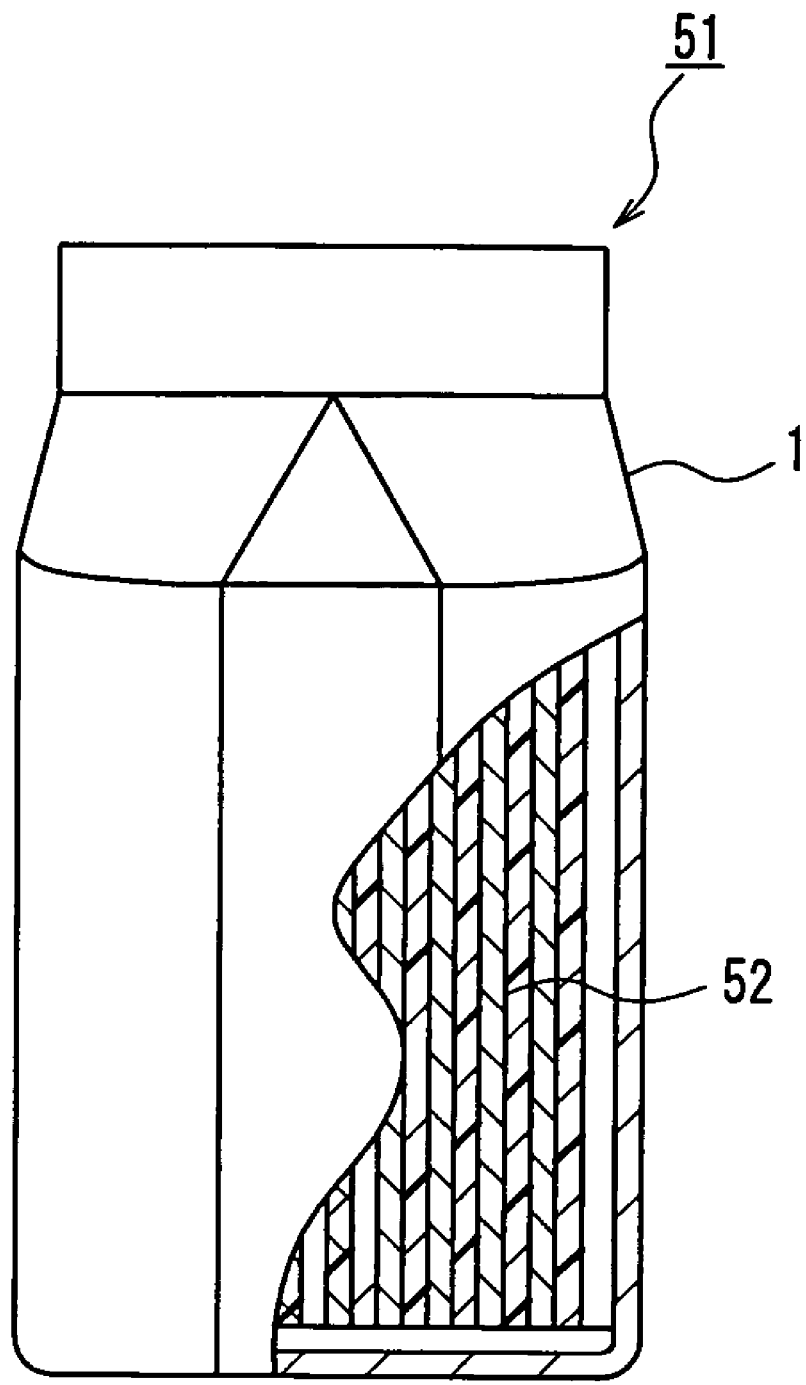
FIG. 1 is a partially cut-away front view showing an example of a battery of the present invention.

Hereinafter, the present invention will be described by way of embodiments with reference to the accompanying drawings. Note here that in the following embodiments, the same components are denoted with the same reference numerals, and the repeated description may be omitted.

As shown in FIG. 1, a prismatic battery 51 of the present invention (hereinafter, referred to as a "battery") includes an electrode plate group 52, an electrolyte (not shown) and a battery case 1 for accommodating the electrode plate group 52 and the electrolyte. Furthermore, a portion for accommodating the electrode plate group 52 in the battery case 1 has a prismatic shape. Specific examples of the prismatic shapes will be described in the embodiments. The shape of a portion of the battery case 1 other than a portion for accommodating the electrode plate group 52 is not particularly limited. For example, the shape may be cylindrical or prismatic. Among them, it is preferable that the head portion has a cylindrical shape as described in the first embodiment.

In the battery 51 of the present invention, a material, size and the like of the battery case 1 are not particularly limited. General materials used for a general battery can be used. For example, the battery case may be made of, for example, Fe—Ni plating can, etc. Materials may be determined arbitrarily in accordance with the kinds of batteries.

Figure 8:
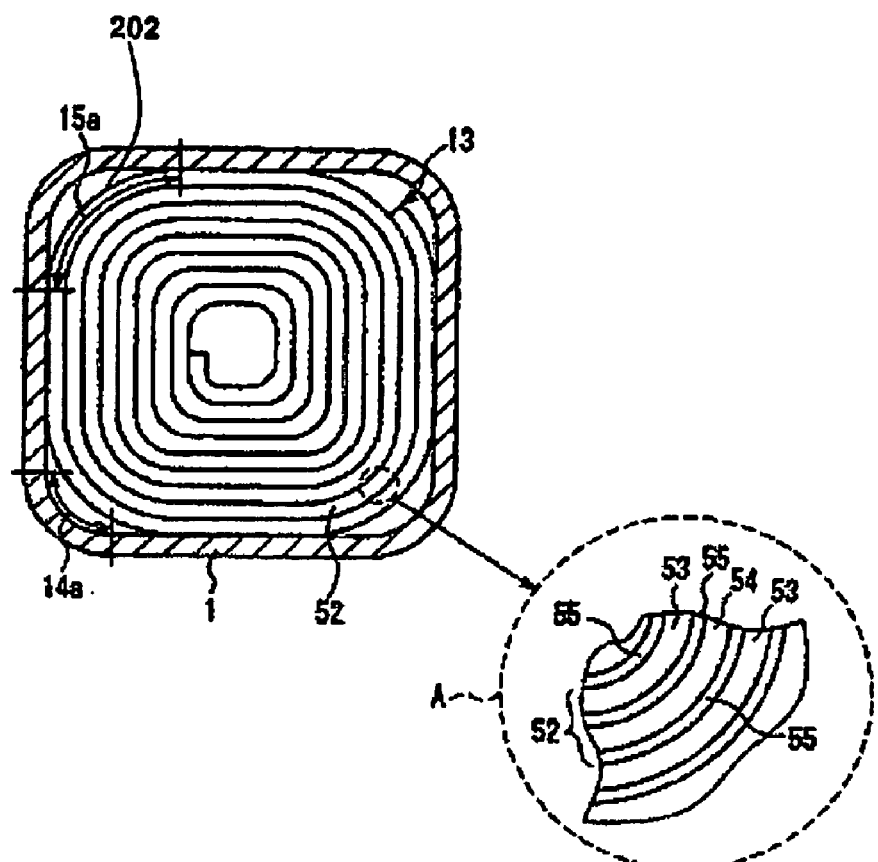
FIG. 8 is a schematic view showing another example of a battery of the present invention.

In the battery 51 of the present invention, a material, a structure and a configuration of the electrode plate group 52 are not particularly limited. An electrode plate group used for a general battery can be used. For example, the electrode plate group 52 may have a structure including a positive electrode plate, a negative electrode plate and a separator in which the positive electrode plate and the negative electrode plate are stacked with the separator interposed therebetween and the stack is wound. The shape of the electrode plate group 52 is not particularly limited and may be, for example, a cylindrical shaped electrode plate group and may be a rectangular shaped electrode plate group. Among them, as illustrated in FIG. 8, the electrode plate group 52 may have a structure in which a positive electrode plate and a negative electrode plate are stacked with a separator interposed therebetween and the stack is wound; and further, the cross-sectional shape of the electrode plate group 52 may have a rectangular, polygonal or oval shape. In the battery 51 of the present invention, since a part for accommodating the electrode plate group 52 in the battery case 1 has a prismatic shape, if the electrode plate group is formed in the above-mentioned shape, a battery with higher volume efficiency can be achieved.

The electrolyte used for the battery 51 of the present invention is not particularly limited. Regardless of solid, liquid, etc., any electrolytes used for a general battery can be used.

By selecting the electrode plate group 52 and the electrolyte, the battery 51 of the present invention may include various kinds of batteries such as an alkaline manganese battery, a nickel-cadmium battery, a nickel metal hydride battery, a lithium battery, and the like, and can be a primary battery or secondary battery.

The battery 51 of the present invention may include members used for a general battery if necessary. For example, the battery 51 may include a gasket for sealing the battery case together with a seal described below, a current collector for collecting current from the electrode plate group, a lead for electrically connecting the electrode plate group or the current collector and terminal or the like. The structures of these materials, location relationship between members, etc. may be the same as those of general batteries.

First Embodiment

One of the features of the battery 51 of the present invention resides in the shape of the battery case 1.

Figure 2:
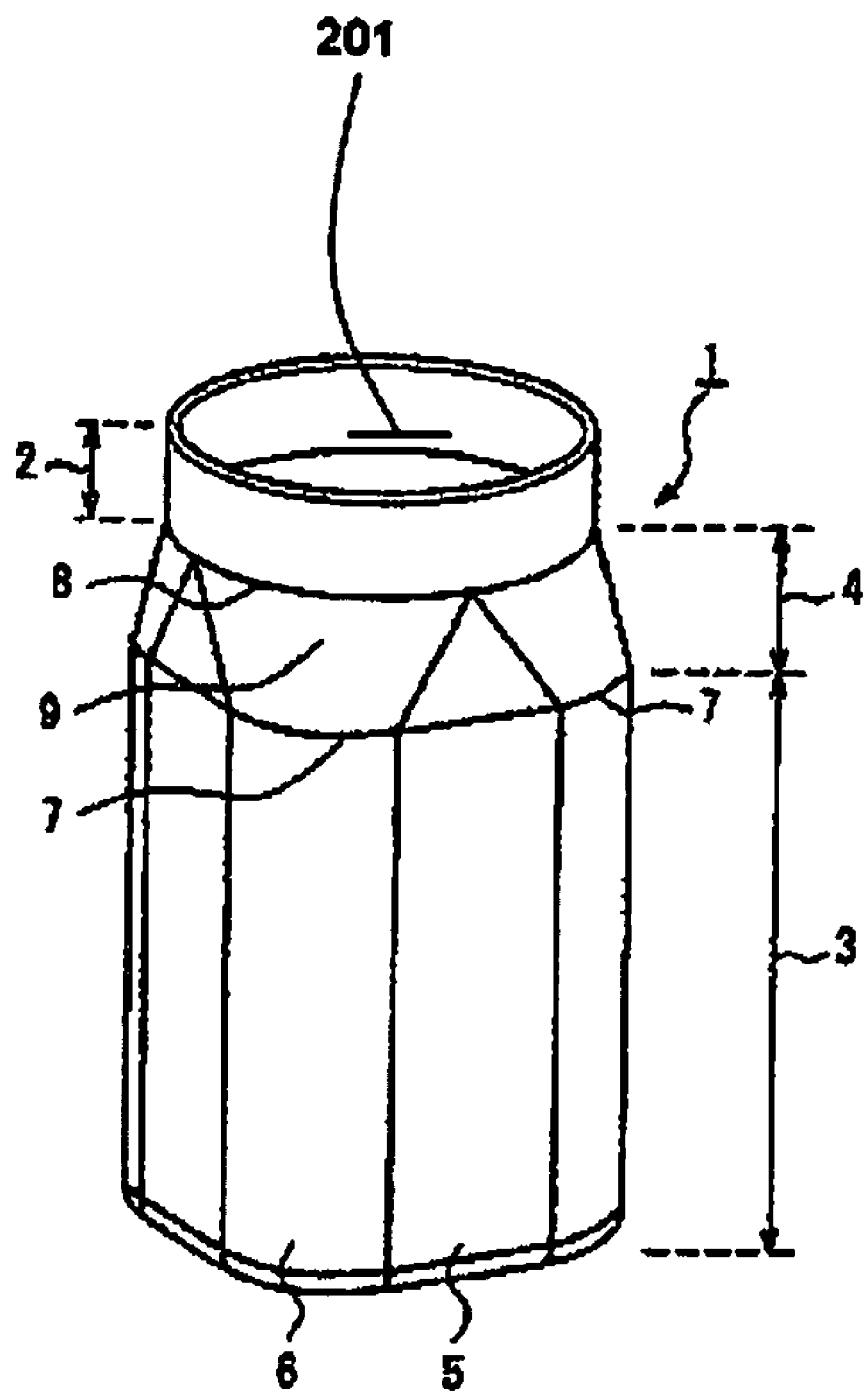
FIG. 2 is a perspective view showing an example of a battery case used in the battery of the present invention.
Figure 3:
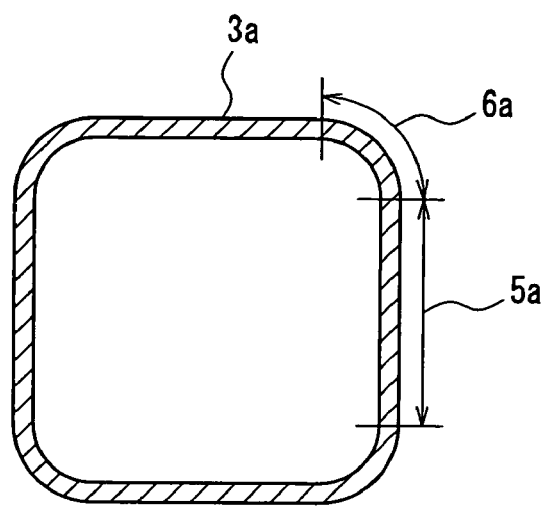
FIG. 3 is a sectional view showing a cross section of the body portion of the battery case shown in FIG. 2 cut in the direction perpendicular to the central axis of the battery case.
Figure 4:
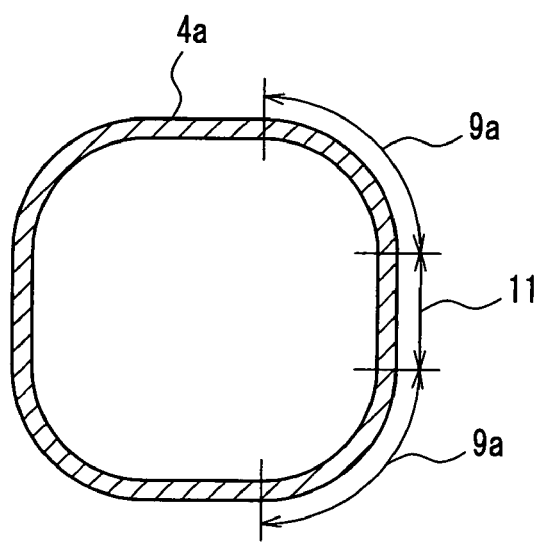
FIG. 4 is a sectional view showing a cross section of a transition portion of the battery case shown in FIG. 2 cut in the direction perpendicular to the central axis of the battery case.
Figure 5:
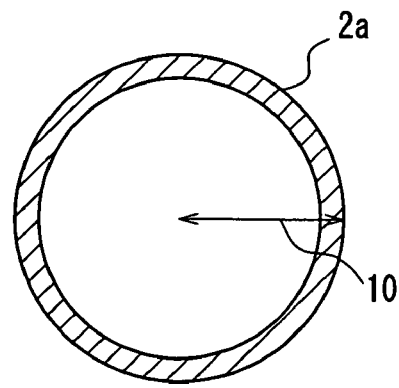
FIG. 5 is a sectional view showing a cross section of a head portion of the battery case shown in FIG. 2 cut in the direction perpendicular to the central axis of the battery case.

FIGS. 2 to 5 respectively show one example of the battery case 1 used for the battery 51 of the present invention. FIG. 3 is a sectional view showing the shape of the cross section 3a of the body portion 3 of the battery case 1 shown in FIG. 2. The cross-section herein denotes a section cut in the direction perpendicular to the central axis of the battery case 1. FIGS. 4 and 5 are cross-sectional views respectively showing the shapes of the cross section 4a of the transition portion 4 and the cross section 2a of the head portion 2. Note here that a view to explain the shape of the battery case 1 such as FIG. 2 occasionally may show a state before accommodating the electrode plate group, etc. and sealing the opening end with a sealing member (i.e., only a battery case 1 is shown).

As shown in FIG. 2, the battery case 1 includes a cylindrical head portion 2, a prismatic body portion 3 for accommodating an electrode plate group and an electrolyte, and a transition portion 4 located between the body portion 3 and the head portion 2. When focused on the side face of the battery case 1, it can be said that the side face of the battery case 1 includes the cylindrical head portion 2, the prismatic body portion 3 for accommodating the electrode plate group and the electrolyte, the transition portion 4 located between the body portion 3 and the head portion 2. The body portion 3 (side face of thereof) includes a flat surface portion 5 and a corner portion 6 (a first corner portion) that links between the adjacent flat surface portions 5 by a curved surface. The shape of the cross-sectional surface 3a of the body portion 3 includes, as shown in FIG. 3, a straight line portion 5a corresponding to the flat surface portion 5 and a curved line portion 6a corresponding to the corner portion 6. The transition portion 4 has a curved surface 9 continued from a boundary 7 between the corner portion 6 of the body portion 3 and the transition portion 4 toward a boundary 8 between the head portion 2 and the transition portion 4. The shape of such a cross section 4a of the transition portion 4, as shown in FIG. 4, includes a curved line portion 9a corresponding to the curved surface 9. Furthermore, a radius of curvature of the cross section of the curved surface 9 (i.e. a radius of curvature of the curved line portion 9a) continuously changes from a radius of curvature (i.e. a radius of curvature of the curved line portion 6a) at the corner portion 6 to a radius 10 of the head portion 2, from the boundary 7 to the boundary 8.

Figure 17:
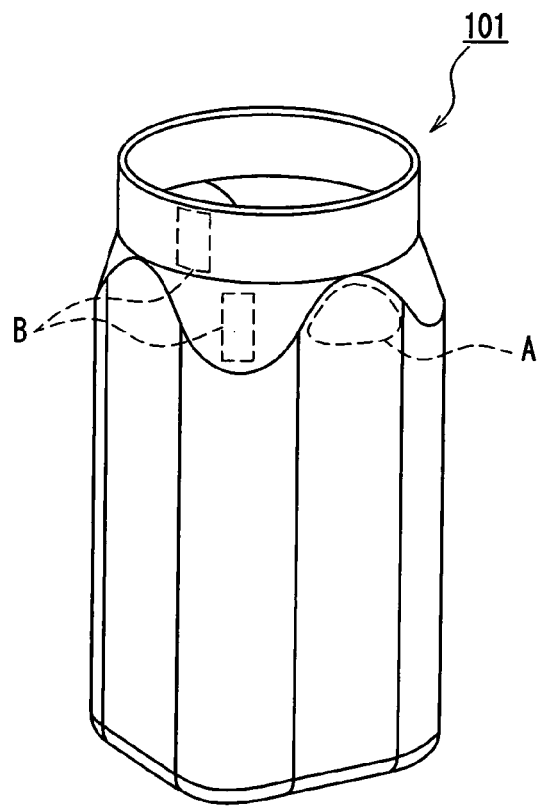
FIG. 17 is a perspective view showing an example of a battery case used for a conventional battery.

By forming such a battery, a battery having desirable properties with advantages of both a rectangular battery and a cylindrical battery can be provided. For example, since the head portion has a cylindrical shape, a battery with a high sealing property (airtightness) can be achieved. Furthermore, since the body portion for accommodating the group of electrode and an electrolyte etc. has a prismatic shape, a battery having high space efficiency can be achieved when a plurality of batteries are stacked or integrated. Furthermore, unlike a conventional battery case 101 as shown in FIG. 17, in the battery case 1 used for the battery of the present invention, it is possible to suppress the occurrence of defects such as wrinkles and swelling during manufacturing. Therefore, crack in the battery case 1 or leakage of electrolyte due to the crack can be suppressed, thus achieving a battery with a high reliability.

The shape and size of the head portion 2 is not particularly limited as long as it has a cylindrical shape. Note here that the shape of the cross sectional face 2a of the head portion 2 is not necessarily a perfect circle. It may be at least a substantially circle (e.g. ellipse). The radius 10 of the head portion 2 may be determined in accordance with the necessary battery volume, and the like. For instance, in the case of the battery whose horizontally-opposed distance of the body portion 3 is the same as the diameter of a SC size battery, the radius is for example, 22 mm to 18 mm, and preferably 22 mm to 20 mm. Furthermore, the radius 10 of the head portion 2 may be, for example, smaller than the horizontally-opposed distance of the body portion 3.

The shape and size, etc. of the body portion 3 are not particularly limited as long as it has a prismatic shape. However, in the battery of the present invention, as shown in FIG. 2, each corner (each side of the prismatic shape) has a predetermined curved shape. The radius of curvature of the corner portion 6 of the body portion 3 may be determined in accordance with the volume of the necessary battery. As one example, when the horizontally-opposed distance of the body portion 3 is the same as the diameter of the battery with the SC size, the radius of curvature is, for example, 10 mm to 5 mm, and preferably 8 mm to 6 mm. Furthermore, the shape of the cross-sectional surface 3a of the body portion 3 may be substantially square.

The radius of curvature of the curved surface 9 of the transition portion 4 is continuously changed from the radius of curvature of the corner portion 6 to the radius of the head body 2, from the boundary 7 to the boundary 8.

In the battery 51 of the present invention, the shape of the cross section of the curved surface 9 i.e., a curve line portion 9a) may be a part of an arc shape and may be brought into contact with a portion of the portion other than the curved surface 9 in the transition portion 4 (i.e., a straight line portion 11 shown in FIG. 4) so as to form a contact circle.

In the battery 51 of the present invention, the curved surface 9 may be a part of a cone surface.

Figure 6:
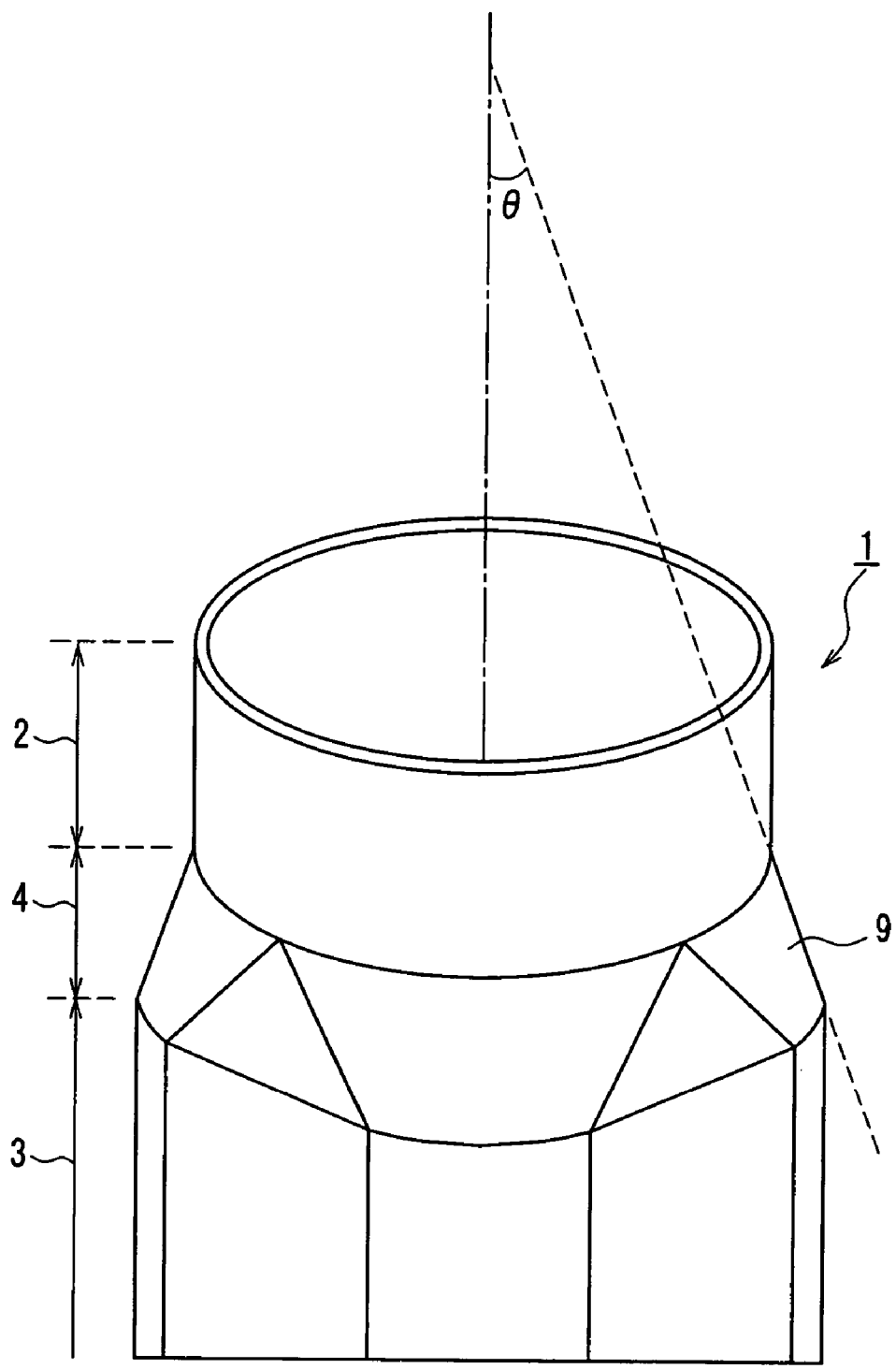
FIG. 6 is a perspective view to explain an angle θ in the battery case used for a battery of the present invention.

In the battery 51 of the present invention, an angle θ of angle of a line connecting the center of the boundary 7 to the boundary 8 on the curved surface 9 by the most direct way with respect to the direction of the central axis of the battery case may be in the range from 14° to 22°. In particular, it is preferable that the angle θ is in the range from 15° to 20°. Such an angle θ is illustrated in FIG. 6. By setting the angle θ at 14° or larger, the width (region) of the transition portion 4 may be smaller, thus reducing the volume of an excess space (i.e., space that does not contribute to charging/discharging). If the curve surface 9 is a part of the cone surface, the above-mentioned line connecting by the most direct way is a line corresponding to a generating line of the cone surface. The center of the boundary 7 is, for example, a point located at an equal distance from both ends when the boundary 7 is a part of an arc.

Figure 7:
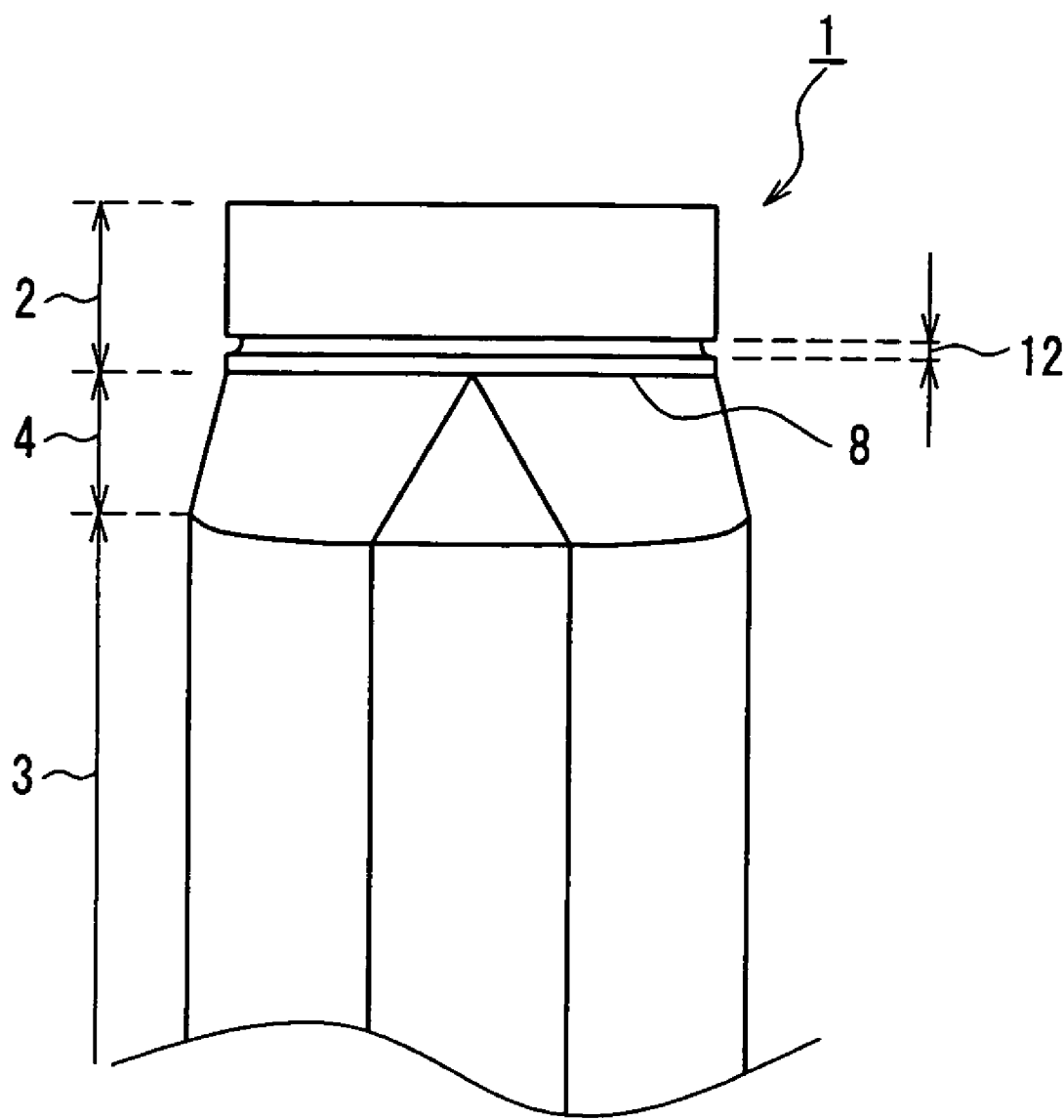
FIG. 7 is a front view showing a main part of another example of a battery case used for a battery of the present invention.

In the battery case 51, a head portion 2 of the battery case 1 may be provided with an annular groove protruding toward the inside from the outside of the head portion 2. FIG. 7 shows one example of such a battery case. In the battery case 1 shown in FIG. 7, the above-mentioned groove 12 is formed on the head portion 2. When such a battery case is used, since a sealing member can be caulked between the groove 12 and an opening end of the head portion 2 in the same manner as in the cylindrical battery, a battery with highly hermetic property (sealing property) can be provided. Furthermore, since the groove 12 is formed on the side face of the cylindrical head portion 2, it can be formed so as not to affect the volume of the body portion 3 for accommodating the electrode plate group and an electrolyte. Therefore, it is possible to minimize the reduction in the volume of the battery due to the formation of the groove 12.

The position of the groove 12 on the side face of the head portion 2 is not particularly limited as long as the groove 12 has an annular shape. For example, the groove 12 may be formed on the surface perpendicular to the central axis of the battery case 1. Furthermore, the groove 12 may be formed immediately above the boundary between the head portion 2 and the transition portion 4.

Note here that lines of the battery case 1 other than an outline of the battery case 1 in FIGS. 1, 2, 6 and 7 are drawn for better understanding the respective parts constituting a battery case and they are not necessarily found on an actual battery case. The same is true in the later views. Furthermore, the flat surface part 5 is not necessarily perfectly flat. Therefore, the straight line portion 5a corresponding to the flat surface portion 5 is not necessarily limited to a perfect straight line. The same is true in a straight line portion 11.

Embodiment 2

Another feature of the battery 51 of the present invention resides in the shape of the electrode plate group 52 and a way for arranging the electrode plates.

FIG. 8 shows one example of the battery of the present invention. FIG. 8 is a schematic cross-sectional view of a part for accommodating the electrode plate group 52 in the battery 51 of the present invention.

In the battery shown in FIG. 8, the electrode plate group 52 includes a positive electrode plate 53, a negative electrode plate 54 and a separator 55. Furthermore, the electrode plate group 52 has a structure in which the positive electrode plate 53 and the negative electrode plate 54 are stacked with the separator 55 interposed therebetween and the stack is wound (see expanded view A of FIG. 8). Herein, the shape of the cross section of the electrode group 52 is rectangular. Furthermore, a radius of curvature of the cross section of the corner portion (second corner portion) in the electrode plate group 52 is larger than a radius of curvature of the inner circumference of the cross section of the corner portion in the battery case 1 (first corner portion). In addition, the electrode plate group 52 is accommodated in the battery case 1 so that a winding end portion 13 of the electrode plate group 52 is located at the first corner portion. Note here that the shape of the portion for accommodating the electrode plate group 52 in the battery case 1 is prismatic. For example, the battery case 1 described in Embodiment 1 may be used.

Figure 18A:
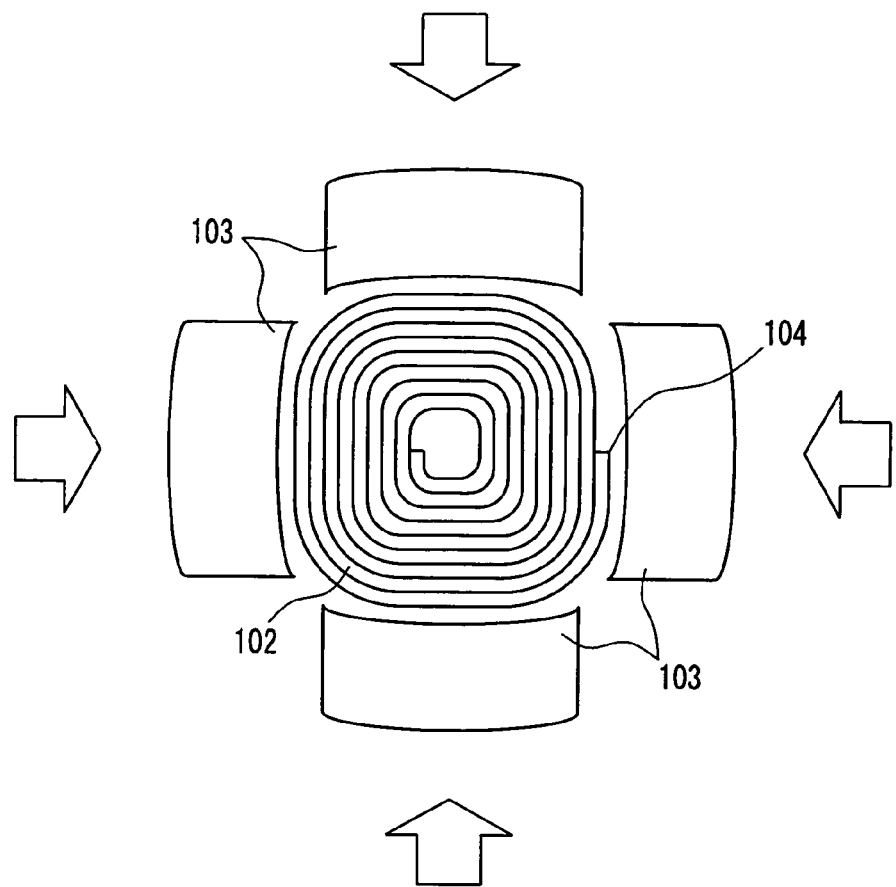
FIG. 18A is a schematic view showing an example of a step of the method for manufacturing a conventional battery.
Figure 18B:
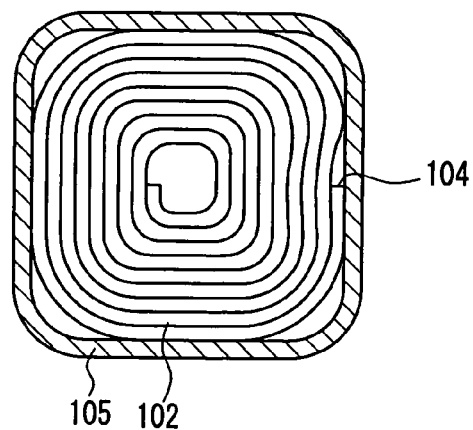
FIG. 18B is a schematic cross-sectional view showing an example of a conventional battery.

With such a configuration, it is possible to obtain the following effects. Since the shape of the portion for accommodating the electrode plate group 52 in the battery case 1 is prismatic, and the shape of the cross-section of the electrode plate 52 is rectangular, the battery is excellent in the volume efficiency. Furthermore, since the winding end portion 13 of the electrode plate group 52 is located in the first corner portion, it is possible to suppress the internal short-circuit due to the edge of the electrode plate located at the outermost circumference as compared with the case where the winding end portion is located at the surface portion of the battery. In the case where the winding end portion is located at the flat surface portion of the battery case, as shown in FIG. 18B, it is thought that stress is generated in the electrode plate group due to the winding portion. Furthermore, when the winding end portion 13 is located in the first corner, the accommodating efficiency of the electrode plate group 52 can be maximized. In addition, when the winding end portion 13 is located in the first corner portion, and further the radius of curvature of the cross section of the second corner portion is larger than the radius of curvature of the inner circumference of the cross section of the first corner portion, it is possible to suppress defective insertion of the electrode plate group 52 into the battery case 1 during manufacture of the batteries.

The radius of curvature of the inner circumference of the cross section of the corner portion of the battery case 1 may be, for example, a radius of curvature of the curved portion 14a shown in FIG. 8. The radius of curvature of the cross section of the corner portion of the electrode plate group 52 may be, for example, a radius of curvature of the curved portion 15a shown in FIG. 8.

The shape of the cross section of the electrode plate group 52 is not limited to rectangular as shown in FIG. 8 but may be polygonal or oval. In any cases, it is possible to obtain the above-mentioned effects. From the viewpoint of the volume efficiency of the battery, it is preferable that the shape of the cross section of the electrode plate group 52 is rectangular.

Figure 9A:
FIG. 9A is a schematic view showing an example of the shape of an electrode plate of a conventional battery.
Figure 9B:
FIG. 9B is a schematic view showing an example of the shape of an electrode plate of the battery of the present invention.

In the battery 51 of the present invention, in at least one of the positive electrode plate and the negative electrode plate, a part of the edge of the end face corresponding to the winding end portion may be shaved off. One example of such an electrode plate is shown in FIG. 9B. In the positive electrode plate 53 shown in FIG. 9A, the end face corresponding to a winding end portion 13 remains as in a usual state. On the other hand, in the positive electrode plate 53 shown in FIG. 9B, a part of the edge of the end face corresponding to the winding end portion 13 is shaved off. Such an edge processing can be carried out by, for example, bringing the end face of the electrode plate that is to be a winding end portion into contact with a rotating grinder. By carrying out such an edge processing, it is possible to suppress the occurrence of the short circuit by the edge of the end face when the electrode plate group 52 is formed by winding. Furthermore, it is possible to suppress defective insertion of the electrode plate group 52 into the battery case 1.

Note here that in the example shown in FIG. 9B, one of the edges of the end face corresponding to the winding end portion 13 in the positive electrode plate 53 is shaved off, but both edges may be shaved off. When one edge is shaved off, it is preferable that the electrode plate group is wound and formed so that the shaved end face is disposed at the outer circumference. Furthermore, the similar edge processing may be carried out with respect to the negative electrode plate. The similar edge processing may be carried out with respect to both the positive electrode plate and the negative electrode plate.

Embodiment 3

The battery 51 of the present invention may have one of the features described in Embodiments 1 and 2, and may have both features.

That is to say, the battery 51 of the present invention is a prismatic battery including an electrode plate group including a positive electrode plate, a negative electrode plate and separator; an electrolyte; and a battery case for accommodating the electrode plate group and the electrolyte;

wherein the side face of the battery case includes a cylindrical head portion; a prismatic body portion for accommodating the electrode plate group and the electrolyte; and the transition portion located between the body portion and the head portion;

the body portion includes a flat surface portion and a corner portion for connecting the adjacent flat surface portions by a curved surface; the transition portion has a continuous curved surface from a first boundary between the corner portion and the transition portion toward a second boundary between the head portion and the transition portion; a radius of curvature of the cross section of the continuous curved surface changes continuously from a radius of curvature of the cross section of the corner portion to a radius of the head portion, from the first boundary to the second boundary; and the electrode plate group is a plate group in which the positive electrode plate and the negative electrode plate are stacked with the separator interposed therebetween and the stack is wound; the shape of the cross section of the electrode plate group is rectangular, polygonal or oval; a radius of curvature of the cross section of the corner portion in the electrode plate group is larger than a radius of curvature of the inner circumference of the corner portion in the battery case; and the electrode plate group may be accommodated in the battery case in such a manner in which the winding end portion of the electrode plate group is located at the corner portion in the battery case.

In other words, the electrode plate group 52 may be accommodated in the battery case 1 as shown in FIG. 2 and the body portion 3 may have a cross section as shown in FIG. 8. In such a battery, the effect described in Embodiments 1 and 2 can be obtained.

Embodiment 4

A method for manufacturing the prismatic battery of the present invention will be described.

The above-mentioned prismatic battery of the present invention can be obtained by, for example, the method of manufacturing the prismatic batteries mentioned below.

The method for manufacturing the prismatic battery is a method for manufacturing a prismatic battery including an electrode plate group including a positive electrode plate, a negative electrode plate and a separator, an electrolyte, and a battery case for accommodating the electrode plate group and the electrolyte. Herein, the electrode plate group included in the prismatic battery has a structure in which the positive electrode plate and the negative electrode plate are stacked with the separator interposed therebetween and the stack is wound. One example of the method for manufacturing the battery of the present invention is described with reference to FIGS. 10 and 11.

Firstly, as shown in FIG. 10, the electrode plate group 52 in which the positive electrode plate and the negative electrode plate are stacked with the separator interposed therebetween and the stack is wound was pressed so that the cross section of the electrode plate group 52 had a rectangular, polygonal or oval shape (step (i)). At this time, the electrode plate group 52 may be pressed so that the radius of curvature of the cross section of the corner portion 202 of the electrode plate group 52 is larger than the radius of curvature of the inner circumference of the corner portion in the battery case for accommodating the electrode plate group 52. Furthermore, the electrode plate group 52 may be pressed so that the winding end portion 13 of the electrode plate group 52 is located at the corner portion in the electrode plate group 52 after being pressed.

For pressing the electrode plate group 52, for example, as shown in FIG. 10, a mold 61 may be used. The shape and number of the mold 61 may be set arbitrarily without being limited to the example shown in FIG. 10.

Then, a pressed electrode plate group 52 and an electrolyte (not shown) are accommodated in the prismatic battery case 21 having the side face including a flat surface portion 5 and a corner portion 6 connecting the adjacent flat surface portions 5 with a curved surface (step (ii)). At this time, a method for accommodating the electrode plate group 52 in the prismatic electrode battery 21 is not particularly limited and may employ a general method. For the prismatic battery case 21, for example, a case having the similar cross sectional shape to that of the body portion 3 in the battery case 1 described in Embodiment 1 may be used.

Finally, an opening portion of the battery case 21 is sealed with a sealing member (step (iii)). In such a manufacturing method, the shape of the electrode plate group 52 formed in the step (i) has the following features. Specifically, the radius of curvature of the cross section of the corner portion 202 in the electrode plate group 52 is larger than the radius of curvature of the inner circumference of the corner portion in the battery case for accommodating the electrode plate group 52. Furthermore, at the same time, the winding end portion 13 of the electrode plate group 52 is located at the corner portion 202 of the electrode plate group 52 after being pressed. Therefore, when the electrode plate group is accommodated in the battery case, it is possible to suppress defective insertion of the electrode plate group. Furthermore, it is possible to suppress an internal short-circuit caused by an end face of the electrode plate included in the electrode plate group. That is to say, it is possible to provide a method of manufacturing prismatic batteries, suppressing the occurrence of defects during manufacturing prismatic batteries and having excellent productivity.

Note here that the electrolyte may be accommodated in the battery case 21 before or after the electrode plate group 52 is accommodated in the battery case 21. It also can be carried out at the same time when the electrode plate group 52 is accommodated in the battery case 21.

In the manufacturing method according to the present invention, in the above-mentioned step (ii), the electrode plate group 52 may be accommodated in the battery case 21 so that the winding end portion of the electrode plate group 52 is located at the corner portion of the battery case 21. Thus, it is possible to provide a method of manufacturing prismatic batteries, suppressing more the occurrence of defects during manufacturing the prismatic batteries and having more excellent productivity.

Figure 11:
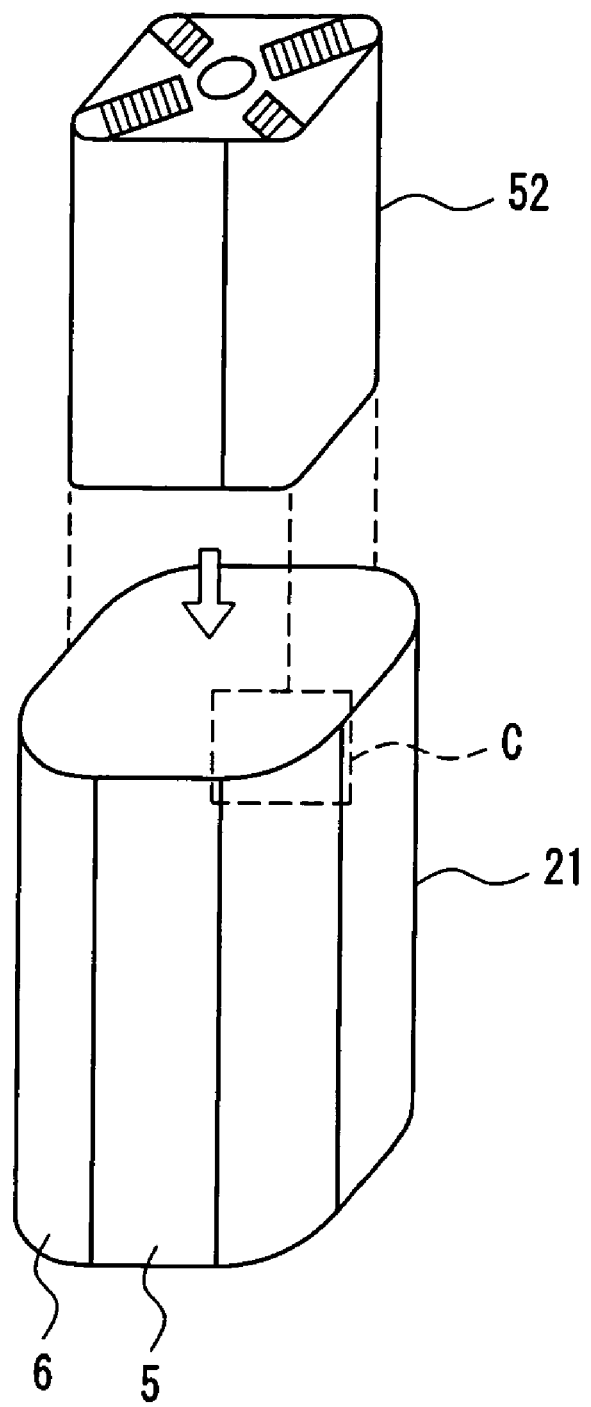
FIG. 11 is a schematic view showing an example of a step of the method for manufacturing a battery of the present invention.
Figure 12:
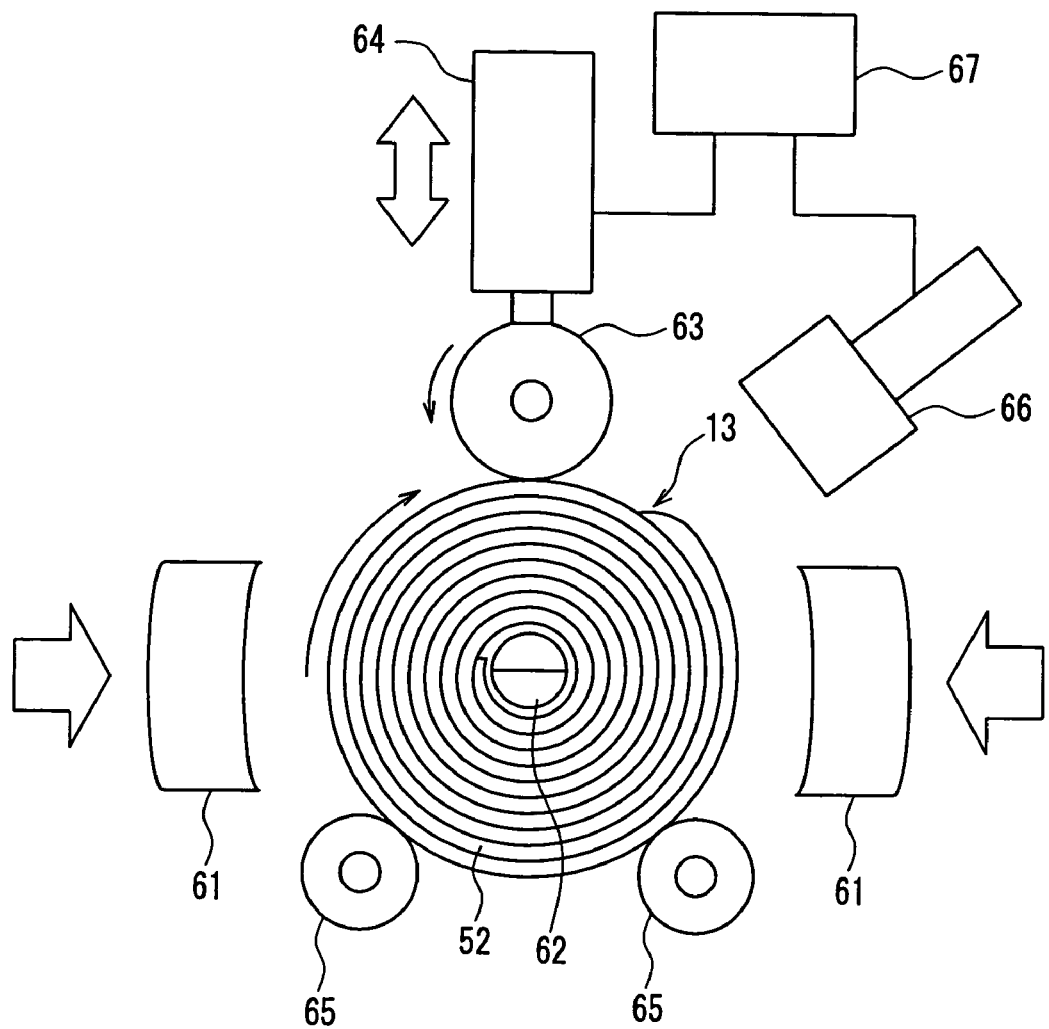
FIG. 12 is a schematic view showing an example of an apparatus capable of carrying out the method for manufacturing the battery of the present invention.

The manufacturing method of the present invention can be carried out by using an apparatus shown in FIG. 12. Firstly, a positive electrode plate and a negative electrode plate are wound around a winding core 62 with a separator interposed between the positive electrode plate and the negative electrode plate so as to form a cylindrical electrode plate group 52. At this time, the electrode plate group 52 is supported by a receiving roller 65 and a driving roller 63, and rotated by the driving roller 63. The driving roller 63 can be urged against to the electrode plate group 52 by a pressure mechanism 64 at a constant pressure. The pressure mechanism 64 is connected to the controller 67. The winding end portion of the electrode plate group 52 is detected by a detection sensor 66 for detecting the end of winding by laser. At this time, the electrode plate group 52 may be retained so that the winding end portion 13 of the electrode plate group 52 is located at the corner portion of the electrode plate group 52 after being pressed. Then, the cylindrical electrode plate group 52 may be formed in a rectangular, polygonal, or flat shape by using a mold 61. Furthermore, as shown in FIG. 11, the electrode plate group 52 may be accommodated in the battery case 21 in a state in which the position of the winding end portion of the electrode plate group 52 is retained.

For example, by using an apparatus shown in FIG. 12, an electrode plate group having a prismatic cross section is formed by stacking a positive electrode plate and a negative electrode plate with a separator therebetween. Herein, the positive electrode plate contains nickel hydroxide as an active material and has a width of 45 mm, a length of 200 mm and a thickness of 0.52 mm and the negative electrode plate contains a hydrogen absorbing alloy as an active material and has a width of 45 mm, a length of 340 mm and a thickness of 0.33 mm. The separator is made of polypropylene and is subjected to a hydrophilic treatment. When the electrode plate group is accommodated in the prismatic battery case together with an electrolyte, in the case where the electrode plate group is retained so that the winding end portion of the electrode plate group is located at the corner portion of the electrode plate group after being pressed, defective insertion into a battery case did not occur. On the other hand, in the case where the electrode plate group is not retained so that the winding end portion of the electrode plate group is located at the corner portion of the electrode plate group after being pressed (that it to say, the winding end portion is located at an arbitrary position in the electrode plate group), defective insertion into a battery case and internal short circuit occur at the frequency of 4.9%. Note here that this evaluation was carried out with respect to 1000 manufactured batteries.

Figure 13:
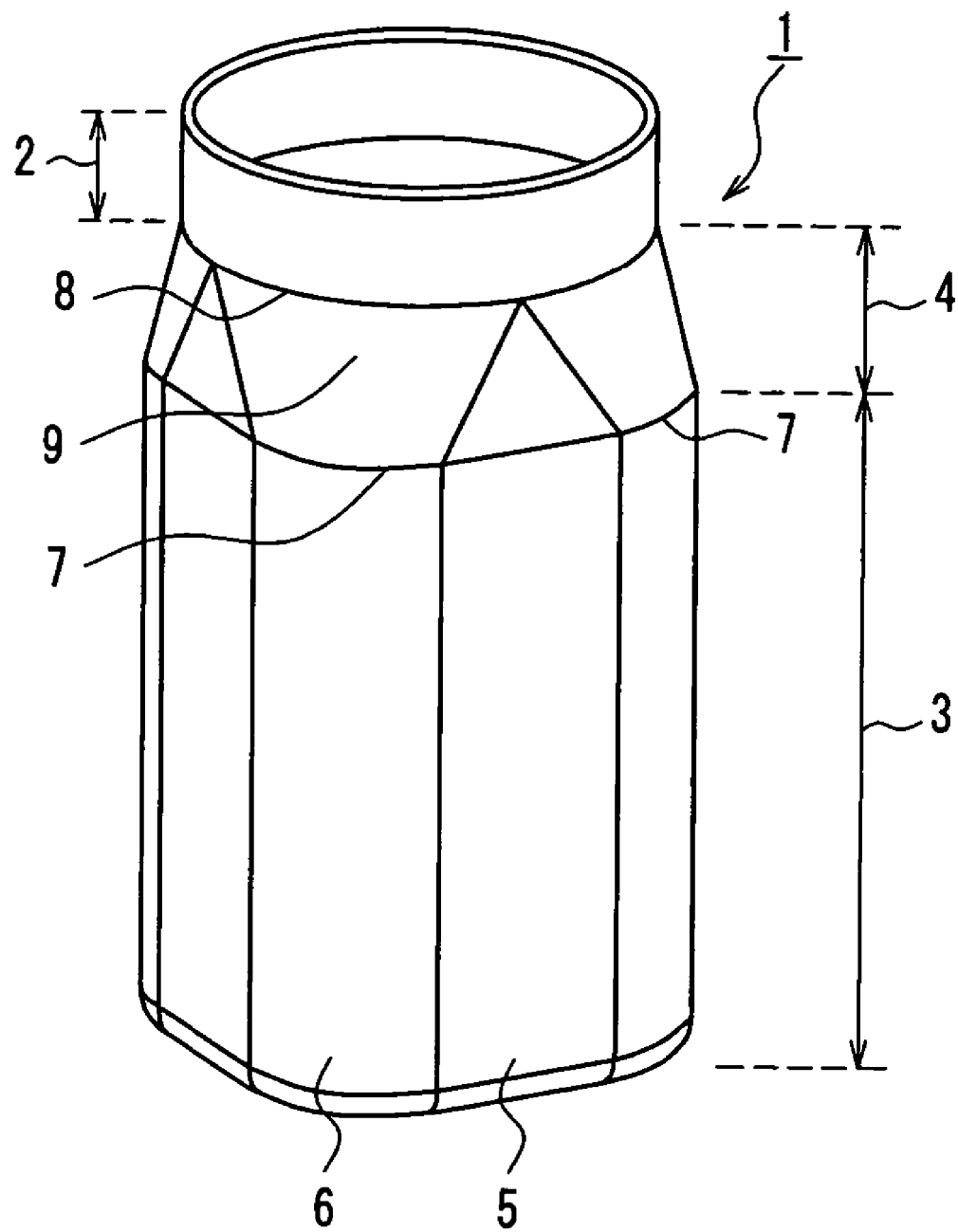
FIG. 13 is a perspective view to explain an example of a step of the method for manufacturing a battery of the present invention.
Figure 14:
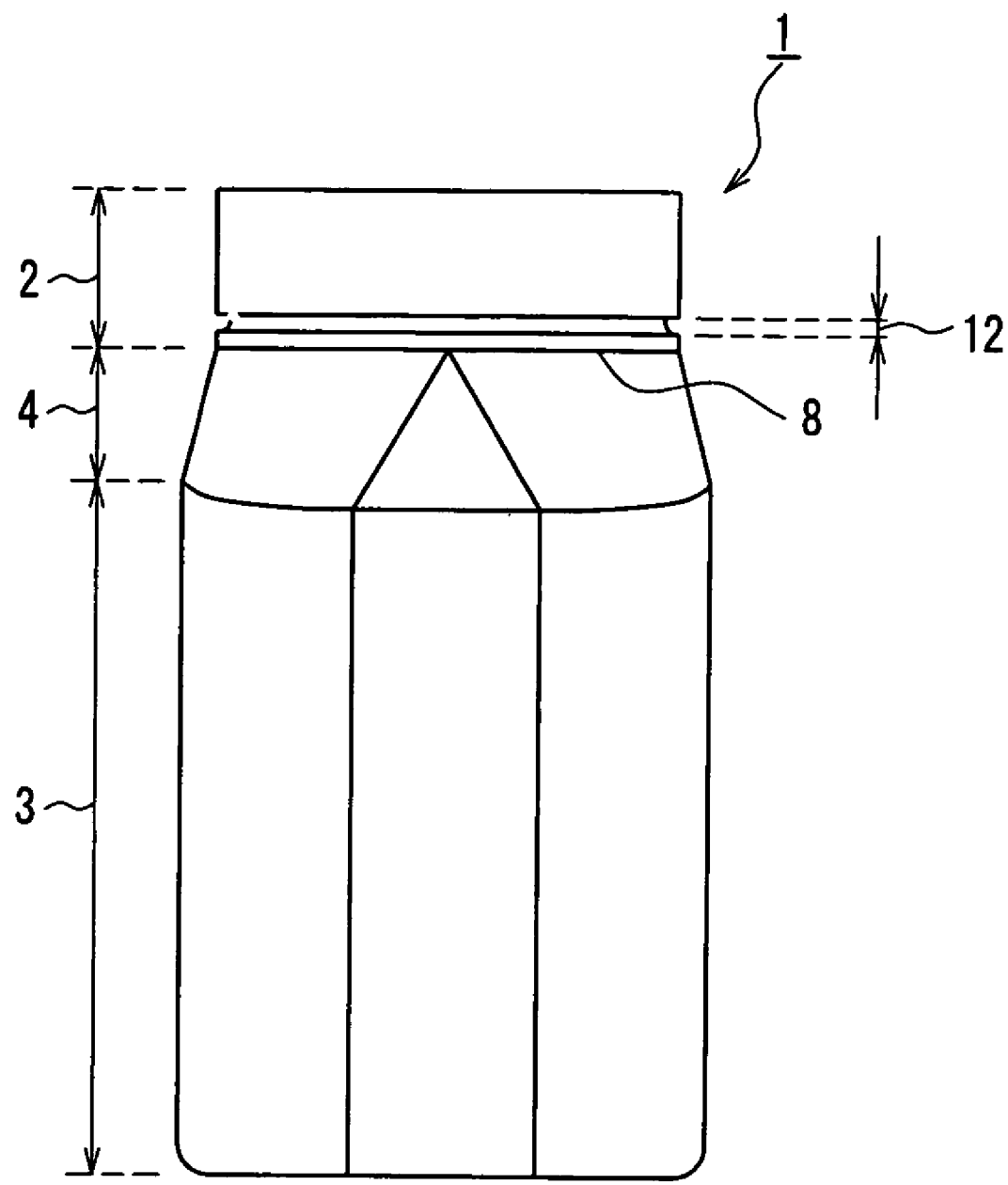
FIG. 14 is a front view to explain an example of a step of the method for manufacturing a battery of the present invention.

In the manufacturing method of the present invention, between the step (ii) and the step (iii), the following steps (a) and (b) further may be included:

(a) a step of forming the battery case 1 including a cylindrical head portion 2, a prismatic body portion 3 and a transition portion 4 located between the body portion 3 and the head portion 2 by forming the vicinity of the opening end portion of the prismatic battery case 21 to have a cylindrical shape (for example, a process for forming a battery case 1 shown in FIG. 13); and (b) a step of forming an annular groove 12 protruding from the outside of the head portion 2 toward the inside of the head portion 2 on the side face of the head portion 2 of the battery case 1 formed in the above-mentioned step (a) (for example, a process for forming a groove 12 shown in FIG. 14).

Figure 15:
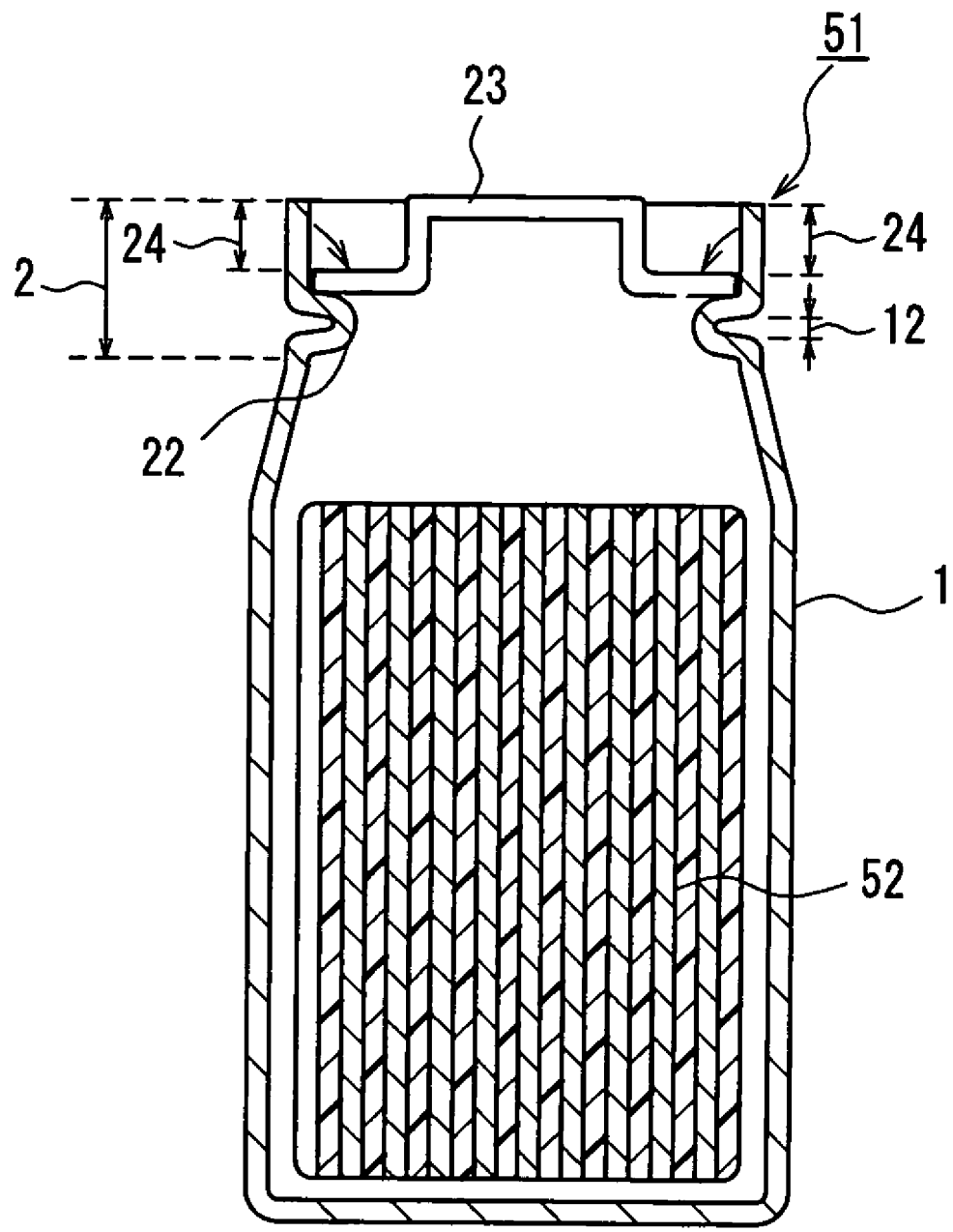
FIG. 15 is a cross-sectional view to explain an example of a step of the method for manufacturing a battery of the present invention.

The above-mentioned step (iii), as shown in FIG. 15, may include a step of disposing a sealing member 23 on an annular support 22 corresponding to the formed groove 12, and then folding the open end portion 24 of the head portion 2 toward the inside thereof; and caulking the sealing member 23 between the open end portion 24 and the support portion 22 to fix thereof; thereby sealing the battery case (step (c)).

At this time, as shown in FIG. 13, in the step (a), the transition portion 4 having a continuous curved surface 9 from a boundary 7 between the corner portion 6 of the body portion 3 and the transition portion 4, toward a boundary 8 between the head portion 2 and the transition portion 4 may be formed. Furthermore, the radius of curvature of the cross section of the curved surface 9 is continuously changed from the radius of curvature of the cross section of the corner portion 6 to the radius of the head portion 2, from the boundary 7 to the boundary 8.

Furthermore, in the step (b), the transition portion 4 may be formed so that the shape of the cross section of the curved surface 9 is a part of an arc and the cross-section of the curved surface 9 is brought into contact with a portion of other than a curved surface 9 in the transition portion 4 so as to form a contact circle.

According to such a manufacturing method, it is possible to manufacture a battery 51 having, in addition to the above-mentioned effects, advantages of both a rectangular battery and a cylindrical battery and having excellent properties. Furthermore, since it is possible to suppress the occurrence of defects such as wrinkles and swelling in the battery case 1 during manufacturing, a method of manufacturing the prismatic battery having more excellent productivity can be provided. Furthermore, by forming the groove 12 on the side face of the head portion 2, between the groove 12 and the open end portion 24 of the head portion 2, the sealing member 23 can be caulked to be fixed with a similar caulking method to that of the cylindrical battery, and thus the battery with high hermetic tightness (sealing property) can be manufactured.

In the above-mentioned step (a), a method for manufacturing the battery case 1 including the transition portion 4 having the curved surface 9 as mentioned above is not particularly limited. For example, a multistage molding method (multistage narrowing) may be used. When the head portion 2 may be formed by the multistage method, for example, shapes of the mold and core are formed gradually in a direction from the bottom portion to the opening portion of the prismatic battery case 21. Note here that the shapes of the head portion and the body portion of the battery case formed in the above-mentioned step (a) may be similar to that of the present invention described in Embodiment 1.

In the manufacturing method of the present invention, in the step (a), the transition portion 4 in which an angle θ of angle of a line connecting the center of the boundary 7 to the boundary 8 on the curved surface 9 by the most direct way with respect to the direction of the central axis of the battery case may be in the range from 14° to 22°. In particular, it is preferable that the transition portion 4 in which the angle θ is in the range from 15° to 20°. Since it is possible to suppress the occurrence of defects such as wrinkles and swelling in the battery case 1 during manufacturing, a method of manufacturing the prismatic battery having more excellent productivity can be provided. When the angle θ is smaller than 140, the volume efficiency of the battery may be deteriorated. Furthermore, if the angle θ is larger than 22°, for example, in the above-mentioned multistage molding method, materials may not be removed from the mold.

The manufacturing method of the present invention may include, before the step (a), the step (A) of caulking the vicinity of the corner portion 6 of the opening portion of the prismatic battery case 21 (for example, the region C in FIG. 11) inwardly. According to such a manufacturing method, since it is possible to further suppress the occurrence of defects such as wrinkles and swelling in the battery case 1 during manufacturing, a method of manufacturing the prismatic battery having more excellent productivity can be provided.

Figure 16:
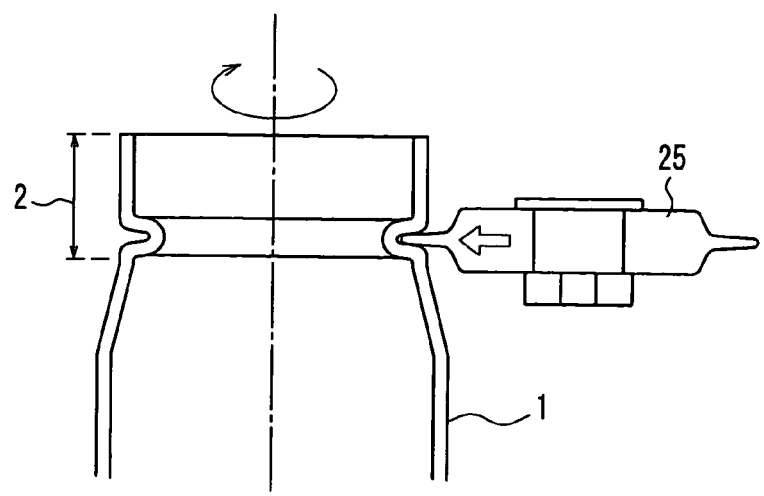
FIG. 16 is a schematic view showing an example of a step of the method for manufacturing a battery of the present invention.

In the step (b), a method for forming the groove 12 is not particularly limited. For example, as shown in FIG. 16, the annular groove 12 may be formed by pressing a groove-forming roller 25 onto the side face of the head portion 2 while rotating the battery case 1 in a state in which a pressing force is applied in the direction from the outside face of the battery case 1 to the central axis of the battery case 1 (step (B)). At this time, for example, while pressing the roller 25, if the roller 25 is displaced in the direction of the opening end of the head portion 2, it is possible to prevent a wall thickness of the battery case 1 from increasing in a certain portion. Furthermore, the position where the roller is pressed may be immediately above the boundary 8. The battery case 1 having a groove 12 formed immediately above the boundary 8 can be formed.

In the step (c), after the sealing member 23 is disposed, the open end portion 24 of the head portion 2 is folded inwardly so as to caulk and fixing the sealing member 23 between the open end portion 24 and the support member 22 is not particularly limited. A method generally used in the manufacturing method of the battery using a cylindrical battery case may be used.

Note here that in FIG. 15, members other than a battery case 1, an electrode plate group 52 and a sealing member 23 are omitted. In the actual battery, if necessary together with the sealing member 23, a gasket for sealing the battery case 1 together with a sealing member 23, a current collector for collecting current from the electrode plate group, a lead for electrically connecting the electrode plate group or the current collector and terminal, or the like. These members may be disposed in any points between the above-mentioned step (ii) and the step (iii). The disposing method may be the general method. It can be applied not only to the battery case 1 shown in FIG. 15 but also to all the batteries of the present invention and method for manufacturing batteries of the present invention.

As mentioned above, according to the present invention, it is possible to provide a prismatic battery having advantages of both a rectangular battery and a cylindrical battery and having excellent properties. Furthermore, it is possible to suppress defects in inserting the electrode plate group into a battery case and having excellent productivity.

Furthermore, the kinds of the prismatic battery of the present invention are not particularly limited. For example, the present invention can be applied to a various kinds of primary and secondary batteries including an alkaline manganese battery, a nickel-cadmium battery, a nickel metal hydride battery, a lithium ion battery, etc. For example, the present invention can be applied to batteries from small batteries used for portable equipment, etc. to a large battery used for hybrid cars.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for manufacturing a prismatic battery, the prismatic battery comprising an electrode plate group comprising a positive electrode plate, a negative electrode plate and a separator, an electrolyte and a battery case for accommodating the electrode plate group and the electrolyte; and the electrode plate group is an electrode plate group in which the positive electrode plate and the negative electrode plate are stacked with the separator interposed therebetween and the stack is wound; the method comprising:

(i) forming a stack by stacking the positive electrode plate and the negative electrode plate with the separator interposed therebetween; winding the stack to form a cylindrical configuration, and pressing the cylindrical configuration so as to have a rectangular, polygonal or oval cross sectional shape;

(ii) accommodating the pressed electrode plate group and the electrolyte in the battery case having a side face provided with a flat surface portion, and a corner portion of the battery case for connecting adjacent flat surface portions with a curved surface; and (iii) sealing an opening portion of the battery case with a sealing member;

wherein in the step (i), the radius of curvature of a cross section of a corner portion of the electrode plate group is larger than the radius of curvature of the inner circumference of the corner portion in the battery case, detecting a winding end portion of the electrode plate group when the winding end portion is positioned on a detection sensor side relative to an innermost winding of the wound stack so that the winding end portion is located to be the corner portion when pressed, and pressing the electrode plate group so that the winding end portion of the electrode plate group is located at the corner portion of the electrode plate group after being pressed, wherein in the step (ii), the pressed electrode plate group is accommodated in the battery case in such a manner in which the winding end portion of the pressed electrode plate group is located at the corner portion of the battery case, the method further comprising the following step (a) between the steps (ii) and (iii), (a) a step of forming a battery case comprising a cylindrical head portion, a prismatic body portion and a transition portion located between the body portion and the head portion by forming the vicinity of the opening portion of the prismatic battery case to have a cylindrical shape, wherein in the step (a), the transition portion having a continuous curved surface is formed from a first boundary between the corner portion of the battery case and the transition portion toward a second boundary between the head portion and the transition portion, and an angle of a line connecting a center of the first boundary to the second boundary on the continuous curved surface by the most direct way with respect to a direction of a central axis of the battery case is in the range from 14° to 22°.

2. The method for manufacturing a prismatic battery according to claim 1, further comprising the following step (b) between the steps (ii) and (iii), (b) a step of forming an annular groove protruding toward the inside of the head portion on the side face of the head portion, and the step (iii) comprises:

(c) a step of disposing a sealing member on an annular support corresponding to the formed groove, and then folding the open end portion of the head portion toward the inside thereof; and caulking the sealing member between the opening end portion and the support portion to fix thereof; thereby sealing an opening portion of the battery case with the sealing member, wherein the radius of curvature of the cross section of the continuous curved surface is continuously changed from the radius of curvature of the cross section of the corner portion of the battery case to the radius of the head portion, from the first boundary to the second boundary.

3. The method for manufacturing a prismatic battery according to claim 1, further comprising the step (A) before the step (a), (A) a step of caulking the vicinity of the corner portion of the opening portion in the battery case to the inside thereof.

4. The method for manufacturing a prismatic battery according to claim 2, wherein the step (b) comprises:

(B) a step of pressing a groove-forming roller onto the side face of the head portion while rotating the battery case in a state in which a pressing power is applied in the direction of a central axis of the battery case from an outside face of the battery case, thereby forming the annular groove.

5. The method for manufacturing a prismatic battery according to claim 4, wherein in the step (B), the annular groove is formed while displacing the grove-forming roller pressed on the side face of the head portion toward the direction of the opening portion of the battery case.

6. The method for manufacturing a prismatic battery according to claim 4, wherein in the step (B), the position to which the roller is pressed is immediately above the second boundary.

7. The method for manufacturing a prismatic battery according to claim 1, further comprising shaving off a part of an edge of an end face corresponding to the winding end portion, in at least one electrode plate selected from the group consisting of the positive electrode plate and the negative electrode plate.

8. The method for manufacturing a prismatic battery according to claim 1, wherein a shape of the cross section of the continuous curved surface is a part of an arc; and the cross section of the continuous curved surface is brought into contact with a portion other than the continuous curved surface in the transition portion so as to form a contact circle.

9. The method for manufacturing a prismatic battery according to claim 1, wherein in the battery case, a wall thickness of the corner portion of the battery case is larger than a wall thickness of the flat surface portion.

10. The method for manufacturing a prismatic battery according to claim 2, further comprising forming the annular groove, which protrudes from an outside face of the head portion toward the inside thereof, immediately above the second boundary in the head portion.

11. The method for manufacturing a prismatic battery according to claim 1, wherein the detection sensor uses a laser for detecting the winding end portion.

* * * * *